United States Patent
Lee et al.

(10) Patent No.: US 10,976,817 B2
(45) Date of Patent: *Apr. 13, 2021

(54) METHOD AND DEVICE FOR EYE TRACKING WITH CONTENT-EMBEDDED GLINTS

(71) Applicant: Apple Inc., Cupertino, CA (US)

(72) Inventors: Jae Hwang Lee, Los Gatos, CA (US); Avi Bar-Zeev, Oakland, CA (US); Fletcher R. Rothkopf, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/941,908

(22) Filed: Jul. 29, 2020

(65) Prior Publication Data

US 2020/0356167 A1    Nov. 12, 2020

Related U.S. Application Data

(63) Continuation of application No. 16/015,858, filed on Jun. 22, 2018, now Pat. No. 10,768,698.

(60) Provisional application No. 62/564,900, filed on Sep. 28, 2017.

(51) Int. Cl.
| | |
|---|---|
| *G06F 3/01* | (2006.01) |
| *G06T 7/73* | (2017.01) |
| *G06K 9/20* | (2006.01) |
| *G06K 9/00* | (2006.01) |
| *G02B 27/01* | (2006.01) |

(52) U.S. Cl.
CPC ......... *G06F 3/013* (2013.01); *G06K 9/00671* (2013.01); *G06K 9/2027* (2013.01); *G06T 7/74* (2017.01); *G02B 27/0172* (2013.01); *G02B 2027/014* (2013.01); *G06T 2207/10048* (2013.01); *G06T 2207/30041* (2013.01)

(58) Field of Classification Search
None
See application file for complete search history.

(56) References Cited

U.S. PATENT DOCUMENTS

2013/0083003 A1*  4/2013  Perez ............... A63F 13/422
                                                      345/419

OTHER PUBLICATIONS

Fraunhofer Comedd, "Fraunhofer Research Institution for Organics, Materials and Electronic Devices Comedd", 2 pages.
"NIR Active Oleds and their Intergration in CMOS Micro-Displays, Fraunhofer Researcher Institution for Organics, Materials and Electronic Devices COMEDD", Aug. 27, 2012, pp. 1-2.

* cited by examiner

*Primary Examiner* — Heather R Jones
(74) *Attorney, Agent, or Firm* — Fernando & Partners, LLP (57) ABSTRACT

In one implementation, a method includes: synthesizing an AR/VR content stream by embedding a plurality of glints provided for eye tracking into one or more content frames of the AR/VR content stream; displaying, via the one or more AR/VR displays, the AR/VR content stream to a user of the HMD; obtaining, via the image sensor, light intensity data corresponding to the one or more content frames of the AR/VR content stream that include the plurality of glints, wherein the light intensity data includes a projection of an eye of the user of the HMD having projected thereon the plurality of glints; and determining an orientation of the eye of the user of the HMD based on the light intensity data.

20 Claims, 7 Drawing Sheets

METHOD AND DEVICE FOR EYE TRACKING WITH CONTENT-EMBEDDED GLINTS

CROSS-REFERENCE TO RELATED APPLICATIONS

This application is a continuation of U.S. patent application Ser. No. 16/015,858, filed on Jun. 22, 2018, which claims priority to U.S. Provisional Patent App. No. 62/564,900, filed on Sep. 28, 2017, which are both hereby incorporated by reference in their entirety.

TECHNICAL FIELD

The present disclosure generally relates to eye tracking, and in particular, to systems, methods, and devices for eye tracking with content-embedded glints.

BACKGROUND

Virtual reality (VR), augmented reality (AR), and mixed reality (MR) are becoming more popular due to their remarkable ability to alter a user's perception of the world. For example, VR, AR, and MR are used for learning purposes, gaming purposes, content creation purposes, social media and interaction purposes, or the like. These technologies differ in the user's perception of his/her presence. VR transposes the user into a virtual space so their VR perception is different from his/her real-world perception. In contrast, AR takes the user's real-world perception and adds something to it. MR is a combination of VR and AR.

These technologies are becoming more commonplace due to, for example, miniaturization of hardware components, improvements to hardware performance, and improvements to software efficiency. As one example, a user may experience VR content by using a head-mounted device (HMD) that encloses the user's field-of-view and is tethered to a computer. As another example, a user may experience AR content by wearing an HMD that still allows the user to see his/her surroundings (e.g., glasses with optical see-through).

As one example, the HMD tracks the user's eyes as an input for interactive AR/VR element. As another example, eye tracking is also used for contextual awareness as to the user's gaze direction or point of fixation. As yet another example, eye tracking is used to perform foveated rendering in order to reduce the resolution of out of focus content to decrease power consumption. As such, eye tracking is a useful input for the AR/VR experience. However, eye tracking is often accomplished with the use of light-emitting diodes (LEDs) fixed to the HMD. This increases the hardware cost and footprint associated with the HMD.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for eye tracking with content-embedded glints. According to some implementations, the method is performed at a head-mounted device (HMD) provided to deliver augmented reality/virtual reality (AR/VR) content, the HMD including with one or more processors, non-transitory memory, one or more AR/VR displays, and an image sensor. The method also includes: synthesizing an AR/VR content stream by embedding a plurality of glints provided for eye tracking into one or more content frames of the AR/VR content stream; displaying, via the one or more AR/VR displays, the AR/VR content stream to a user of the HMD; obtaining, via the image sensor, light intensity data corresponding to the one or more content frames of the AR/VR content stream that include the plurality of glints, wherein the light intensity data includes a projection of an eye of the user of the HMD having projected thereon the plurality of glints; and determining an orientation of the eye of the user of the HMD based on the light intensity data.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

As one example, the HMD tracks the user's eyes as an input for interactive AR/VR element. As another example, eye tracking is also used for contextual awareness as to the user's gaze direction or point of fixation. As yet another example, eye tracking is used to perform foveated rendering in order to reduce the resolution of out of focus content to decrease power consumption. As such, eye tracking is a useful input for the AR/VR experience. However, eye tracking is often accomplished with the use of light-emitting diodes (LEDs) fixed to the HMD. This increases the hardware cost and footprint associated with the HMD. Therefore, the below described innovation synthesizes an AR/VR content stream by embedding a plurality of glints provided for eye tracking into one or more content frames of the AR/VR content stream in order to reduce the hardware complexity of the HMD and to reduce its power consumption.

Figure 1:
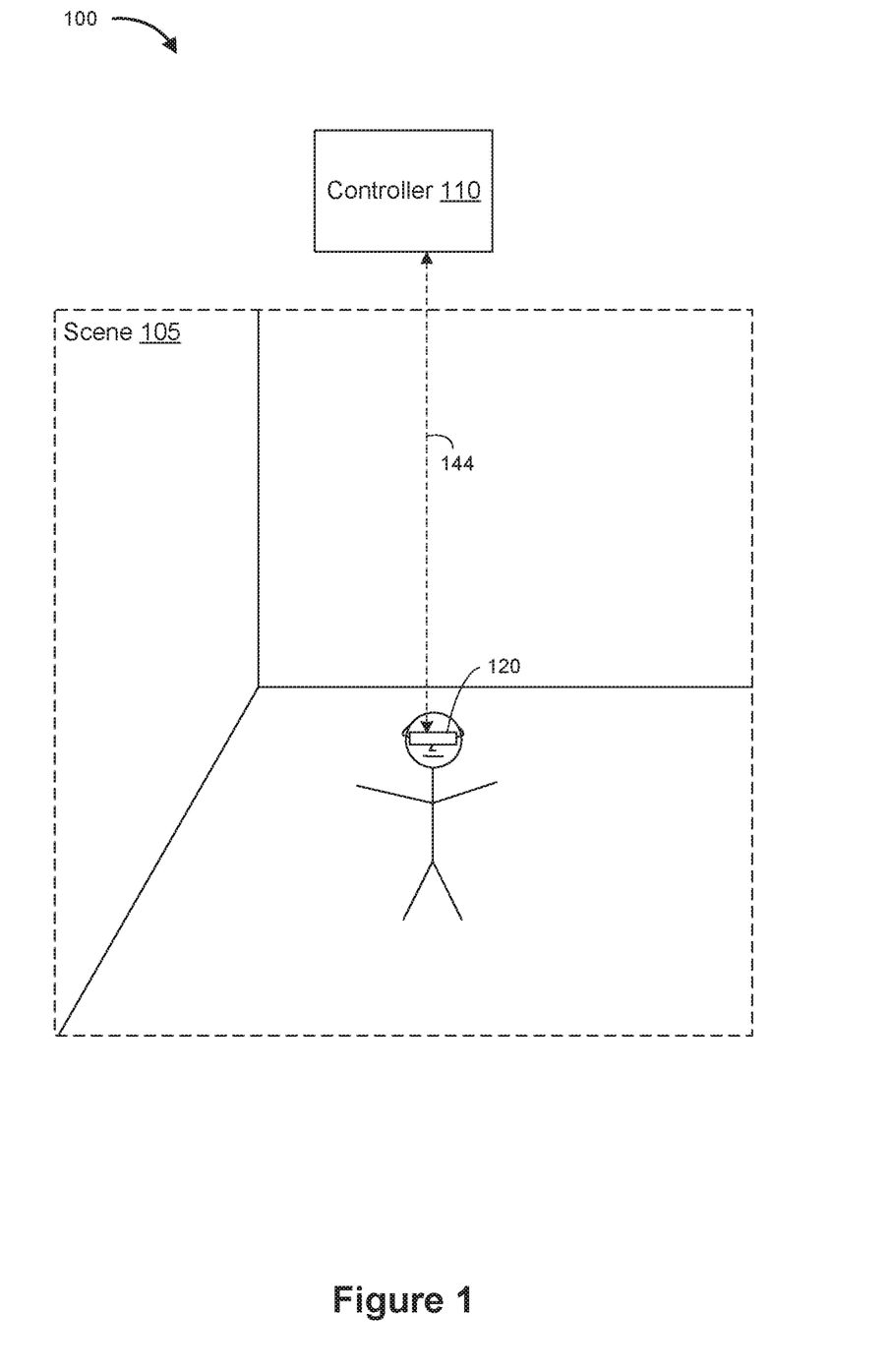
FIG. 1 is a block diagram of an example operating environment in accordance with some implementations.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and a head-mounted device (HMD) 120.

In some implementations, the controller 110 is configured to manage and coordinate an augmented reality/virtual reality (AR/VR) experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.).

In some implementations, the HMD 120 is configured to present the AR/VR experience to the user. In some implementations, the HMD 120 includes a suitable combination of software, firmware, and/or hardware. The HMD 120 is described in greater detail below with respect to FIG. 3. In some implementations, the functionalities of the controller 110 are provided by and/or combined with the HMD 120.

According to some implementations, the HMD 120 presents an augmented reality/virtual reality (AR/VR) experience to the user while the user is virtually and/or physically present within the scene 105. In some implementations, while presenting an augmented reality (AR) experience, the HMD 120 is configured to present AR content and to enable optical see-through of the scene 105. In some implementations, while presenting a virtual reality (VR) experience, the HMD 120 is configured to present VR content.

In some implementations, the user wears the HMD 120 on his/her head. As such, the HMD 120 includes one or more AR/VR displays provided to display the AR/VR content. For example, the HMD 120 encloses the field-of-view of the user. In some implementations, the HMD 120 is replaced with an AR/VR chamber, enclosure, or room configured to present AR/VR content in which the user does not wear the HMD 120.

Figure 2:
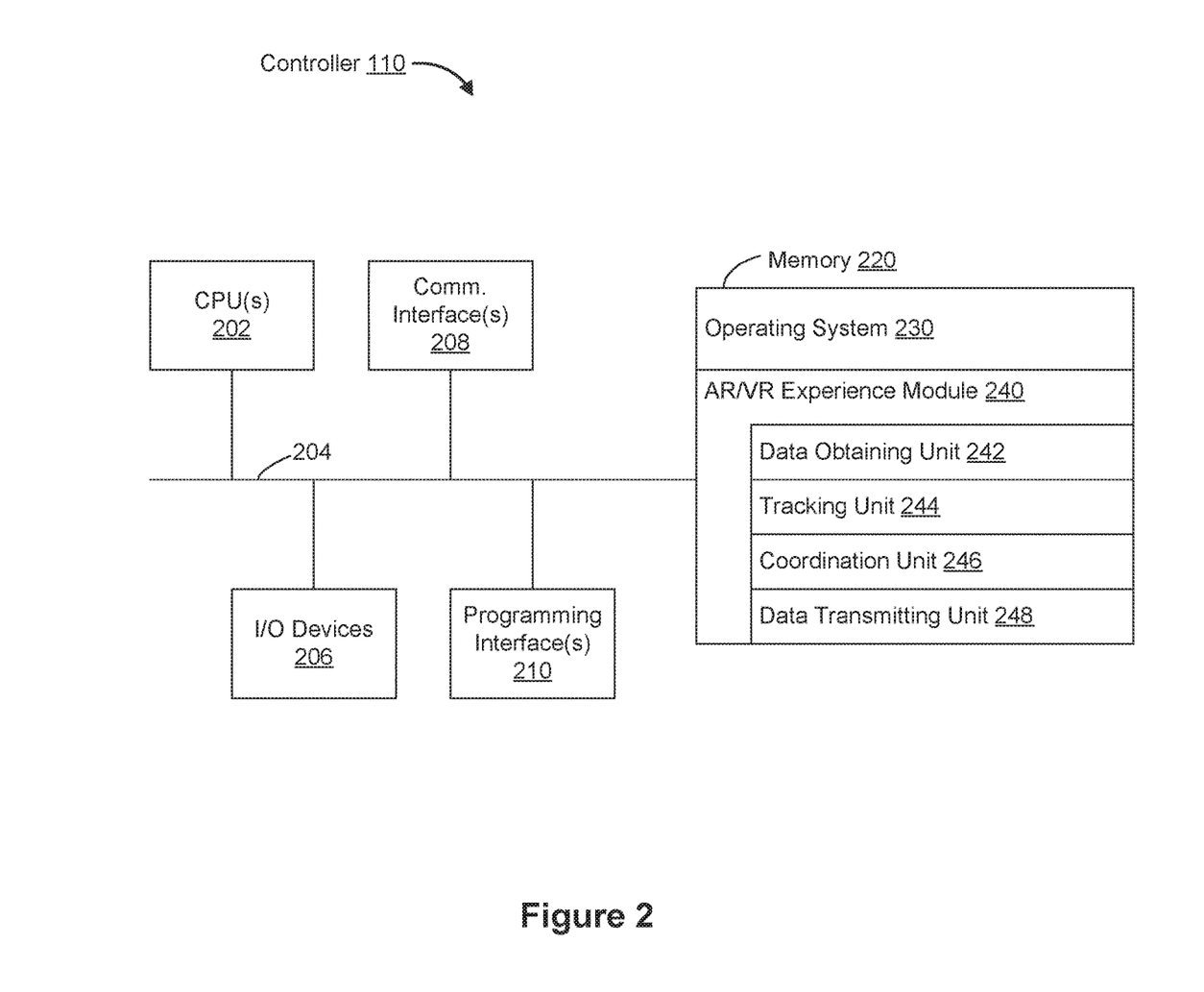
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an augmented reality/virtual reality (AR/VR) experience module 240.

The operating system 230 includes procedures for handling various basic system services and for performing hardware dependent tasks. In some implementations, the AR/VR experience module 240 is configured to manage and coordinate one or more AR/VR experiences for one or more users (e.g., a single AR/VR experience for one or more users, or multiple AR/VR experiences for respective groups of one or more users). To that end, in various implementations, the AR/VR experience module 240 includes a data obtaining unit 242, a tracking unit 244, a coordination unit 246, and a data transmitting unit 248.

In some implementations, the data obtaining unit 242 is configured to obtain data (e.g., presentation data or AR/VR content stream, user interaction data, sensor data, location data, etc.) from at least the HMD 120. To that end, in various implementations, the data obtaining unit 242 includes instructions and/or logic therefor, and heuristics and metadata therefor.

In some implementations, the tracking unit 244 is configured to map the scene 105 and to track the position/location of at least the HMD 120 with respect to the scene 105. To that end, in various implementations, the tracking unit 244 includes instructions and/or logic therefor, and heuristics and metadata therefor.

In some implementations, the coordination unit 246 is configured to manage and coordinate the AR/VR experience presented to the user by the HMD 120. To that end, in various implementations, the coordination unit 246 includes instructions and/or logic therefor, and heuristics and metadata therefor.

In some implementations, the data transmitting unit 248 is configured to transmit data (e.g., presentation data or AR/VR content stream, location data, etc.) to at least the HMD 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as a functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 3:
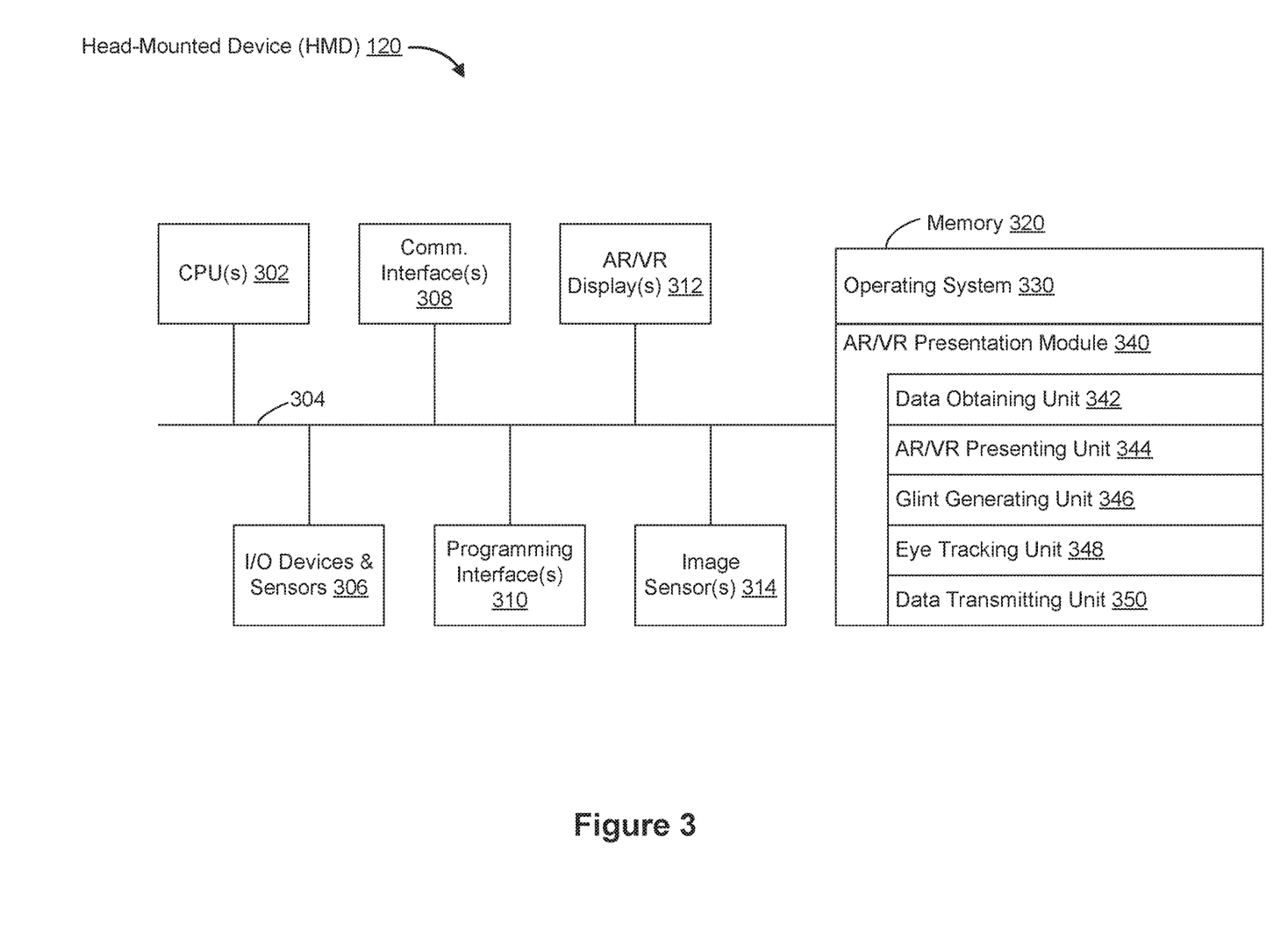
FIG. 3 is a block diagram of an example head-mounted device (HMD) in accordance with some implementations.

FIG. 3 is a block diagram of an example of the head-mounted device (HMD) 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more AR/VR displays 312, one or more optional interior and/or exterior facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more AR/VR displays 312 are configured to present the AR/VR experience to the user. In some implementations, the one or more AR/VR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more AR/VR displays 312 correspond to diffractive, reflective, polarized, holographic, etc. waveguide displays. For example, the HMD 120 includes a single AR/VR display. In another example, the HMD 120 includes an AR/VR display for each eye of the user. In some implementations, the one or more AR/VR displays 312 are capable of presenting AR and VR content. In some implementations, the one or more AR/VR displays 312 are capable of presenting AR or VR content. In some implementations, the one or more optional image sensors 314 correspond to one or more RGB camera (e.g., with a complimentary metal-oxide-semiconductor (CMOS) image sensor or a charge-coupled device (CCD) image sensor), IR image sensor, event-based camera, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an AR/VR presentation module 340.

The operating system 330 includes procedures for handling various basic system services and for performing hardware dependent tasks. In some implementations, the AR/VR presentation module 340 is configured to present AR/VR content to the user via the one or more AR/VR displays 312. To that end, in various implementations, the AR/VR presentation module 340 includes a data obtaining unit 342, an AR/VR presenting unit 344, a glint generating unit 346, an eye tracking unit 348, and a data transmitting unit 350.

In some implementations, the data obtaining unit 342 is configured to obtain data (e.g., presentation data or AR/VR content stream, user interaction data, sensor data, location data, etc.) from at least o the controller 110. To that end, in various implementations, the data obtaining unit 342 includes instructions and/or logic therefor, and heuristics and metadata therefor.

In some implementations, the AR/VR presenting unit 344 is configured to render (e.g., synthesize) an AR/VR content stream, including a plurality of frames, and present said AR/VR content stream via the one or more AR/VR displays 312. To that end, in various implementations, the AR/VR presenting unit 344 includes instructions and/or logic therefor, and heuristics and metadata therefor.

In some implementations, the glint generating unit 346 is configured to determine and generate a glint pattern including a plurality of glints to be embedded into at least some of the frames of the AR/VR content stream. To that end, in various implementations, the glint generating unit 346 includes instructions and/or logic therefor, and heuristics and metadata therefor.

In some implementations, the eye tracking unit 348 is configured to obtain, via the one or more images sensors 314, light intensity data (e.g., images or events) corresponding to the one or more content frames of the AR/VR content stream that include the plurality of glints, wherein the light intensity data includes a projection of an eye of the user of the HMD 120 having projected thereon the plurality of glints. In some implementations, the eye tracking unit 348 is also configured to determine an orientation (or gaze direction) of the eye of the user of the HMD 120 based on the light intensity data. To that end, in various implementations, the eye tracking unit 348 includes instructions and/or logic therefor, and heuristics and metadata therefor.

In some implementations, the data transmitting unit 350 is configured to transmit data (e.g., presentation data or AR/VR content stream, location data, user interaction data, etc.) to at least the controller 110. To that end, in various implementations, the data transmitting unit 350 includes instructions and/or logic therefor, and heuristics and metadata therefor.

Although the data obtaining unit 342, the AR/VR presenting unit 344, the glint generating unit 346, the eye tracking unit 348, and the data transmitting unit 350 are shown as residing on a single device (e.g., the HMD 120), it should be understood that in other implementations, any combination of the data obtaining unit 342, the AR/VR presenting unit 344, the glint generating unit 346, the eye tracking unit 348, and the data transmitting unit 350 may be located in separate computing devices.

Moreover, FIG. 3 is intended more as a functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 4:
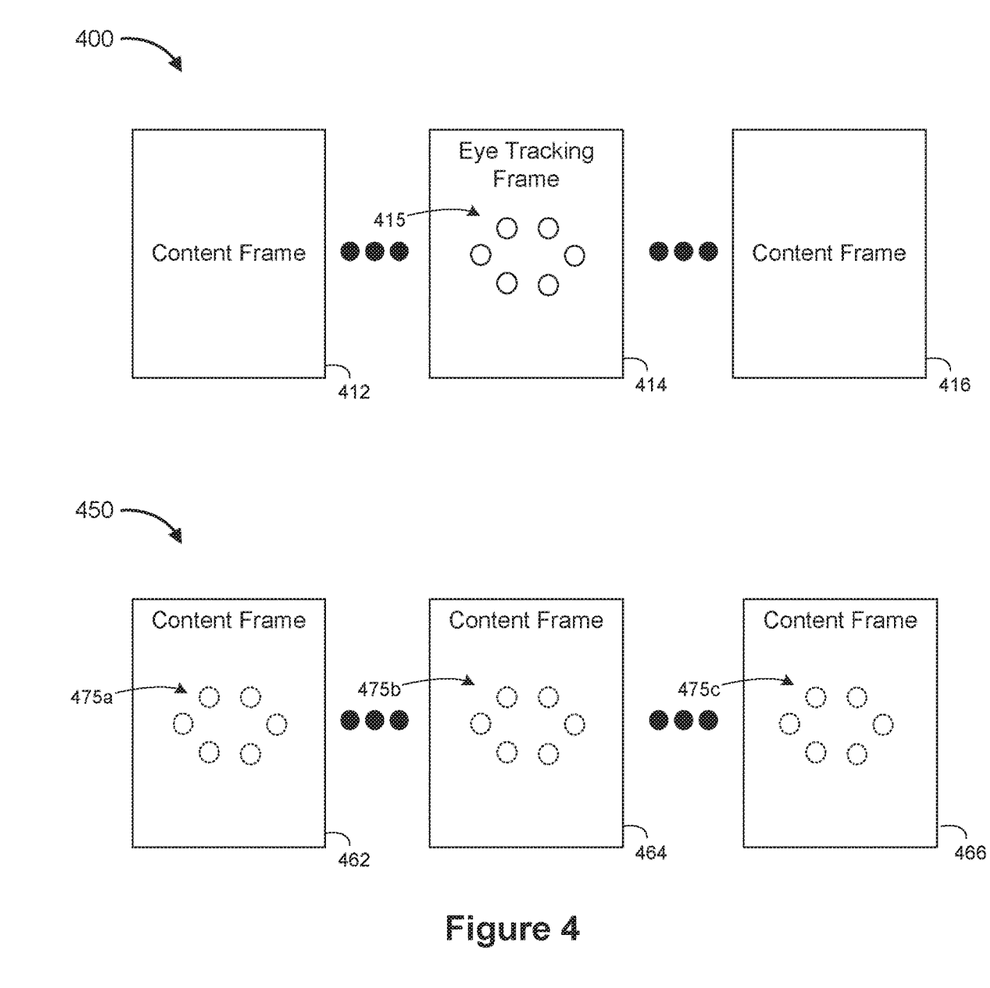
FIG. 4 illustrates example embodiments for embedding a plurality of glints provided for eye tracking into one or more content frames of an AR/VR content stream in accordance with some implementations.

FIG. 4 illustrates example embodiments 400 and 450 for embedding a plurality of glints provided for eye tracking into one or more content frames of the AR/VR content stream in accordance with some implementations. While certain specific features are illustrated, those skilled in the art will appreciate from the present disclosure that various other features have not been illustrated for the sake of brevity, and so as not to obscure more pertinent aspects of the implementations disclosed herein.

As shown in FIG. 4, example embodiments 400 and 450 show example AR/VR content streams including a plurality of frames. As will be appreciated by one of ordinary skill in the art, although FIG. 4 depicts three frames for each of the example embodiments, the example embodiments may include any number of frames in various other implementations.

According to some implementations, the example embodiment 400 illustrates an eye tracking frame 414 with a plurality of glints 415 embedded thereon interleaved amongst content frames 412 and 416. In some implementations, the plurality of glints 415 is arranged according to a predetermined pattern (e.g., a pseudorandom pattern, a grid pattern, a line/bar pattern, a speckle pattern, a fractal pattern, etc.). In some implementations, the plurality of glints 415 is arranged according to a dynamically determined/changing pattern. According to some implementations, the pattern in which the plurality of glints 415 is arranged is determined based on ambient light conditions, eye tracking (e.g., predictive glint positions/patterns), locations of interactive AR/VR content (e.g., increase density of glints relative to locations of interactive content for improved eye tracking), or the like.

In some implementations, each of the plurality of glints 415 are shaped according to a predefined shape (e.g., circles, ovals, polygons, speckle clouds, rectangles, stars, hexagons, etc.). In some implementations, each of the plurality of glints 415 are shaped according to a dynamically determined/changing shape. According to some implementations, the shape of each of the plurality of glints 415 are determined based on ambient light conditions (e.g., stars, hexagons, etc. instead of dots to discriminate from ambient light), eye tracking (e.g., predictive glint positions/patterns), locations of interactive AR/VR content (e.g., increase density of glints relative to locations of interactive content for improved eye tracking), or the like.

In some implementations, the plurality of glints 415 is included in specific eye tracking frames (e.g., the eye tracking frame 414) separate from the AR/VR content frames (e.g., the content frames 412 and 416). For example, one out of every X content frames includes an eye tracking frame with the plurality of glints. As such, according to some implementations, one or more content frames of the AR/VR content stream that include the plurality of glints correspond to visible eye tracking frame displayed according to a predefined ratio of eye tracking frames to content frames. For example, the plurality of glints is displayed in the visible (e.g., RGB) domain.

According to some implementations, the example embodiment 450 illustrates a content frame 462 with a plurality of glints 475a embedded thereon, a content frame 464 with a plurality of glints 475b embedded thereon, and a content frame 466 with a plurality of glints 475c embedded thereon. According to some implementations, each of the plurality of glints 475a, 475b, and 475c correspond to a same predetermined pattern (e.g., a pseudorandom pattern, a grid pattern, a line/bar pattern, a speckle pattern, a fractal pattern, etc.). According to some implementations, each of the plurality of glints 475a, 475b, and 475c correspond to a dynamically determined/changing pattern. According to some implementations, the pattern in which the plurality of glints 475a, 475b, and 475c are arranged is determined based on ambient light conditions, eye tracking (e.g., predictive glint positions/patterns), locations of interactive AR/VR content (e.g., increase density of glints relative to locations of interactive content for improved eye tracking), or the like (e.g., at the time the respective AR/VR content frame is rendered).

In some implementations, each of the plurality of glints 475a, 475b, and 475c are shaped according to a predefined shape (e.g., circles, ovals, polygons, speckle clouds, rectangles, stars, hexagons, etc.). In some implementations, each of the plurality of glints 475a, 475b, and 475c are shaped according to a dynamically determined/changing shape. According to some implementations, the shape of each of the plurality of glints 475a, 475b, and 475c are determined based on ambient light conditions (e.g., stars, hexagons, etc. instead of dots to discriminate from ambient light), eye tracking (e.g., predictive glint positions/patterns), locations of interactive AR/VR content (e.g., increase density of glints relative to locations of interactive content for improved eye tracking), or the like (e.g., at the time the respective AR/VR content frame is rendered).

In some implementations, the plurality of glints 475a, 475b, and 475c are embedded into the AR/VR content frames 462, 464, and 466, respectively. For example, the plurality of glints is displayed in the IR domain. In some implementations, the portion of the AR/VR content that includes the glints is out-of-phase when presented to the user (e.g., alternating eyes). According to some implementations, the one or more content frames of the AR/VR content stream that include the plurality of glints correspond to IR glints on top of content frames.

Figure 5A:
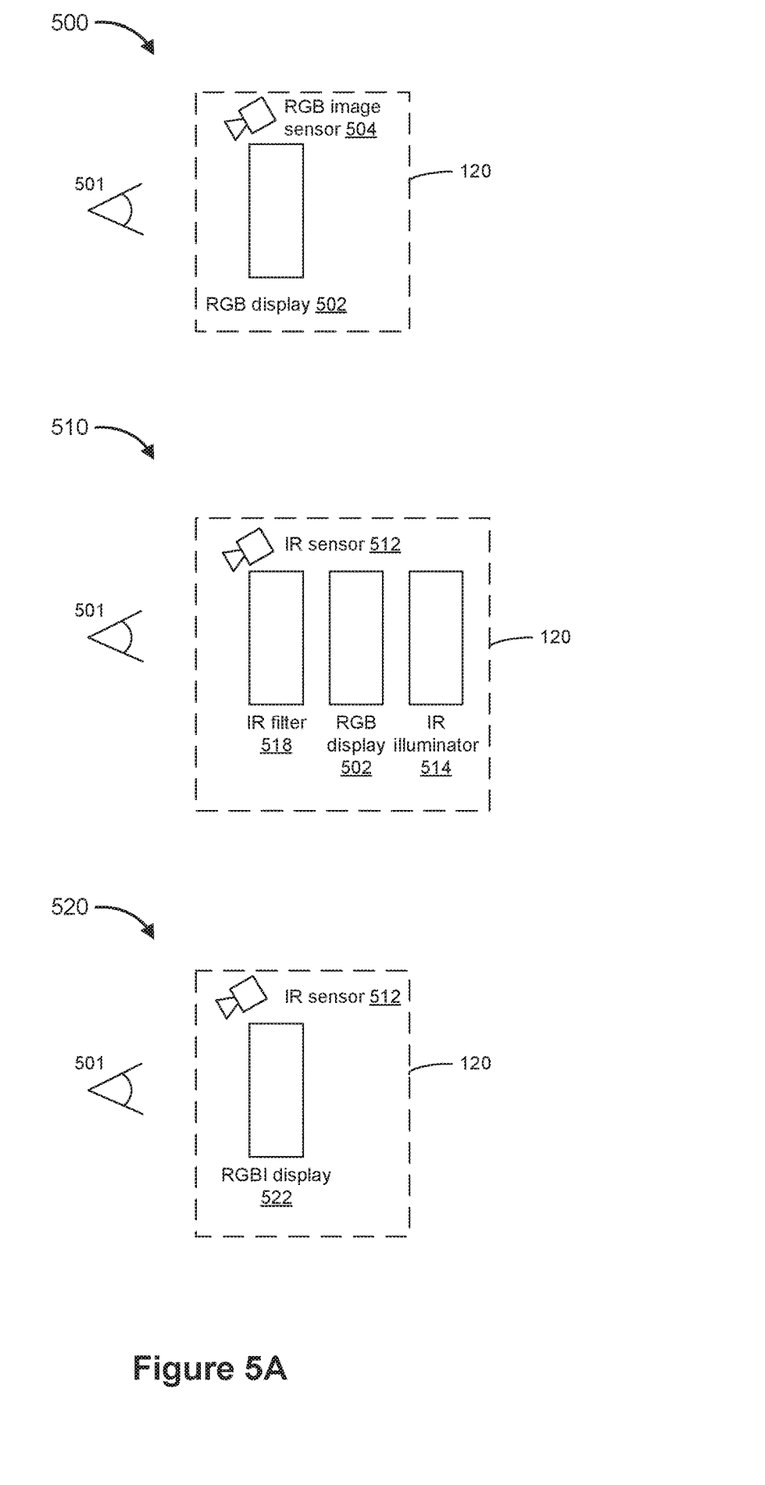
FIGS. 5A-5B illustrate example AR/VR content stream presentation environments in accordance with some implementations.

FIG. 5A illustrates example AR/VR content stream presentation environments 500, 510, and 520 in accordance with some implementations. While certain specific features are illustrated, those skilled in the art will appreciate from the present disclosure that various other features have not been illustrated for the sake of brevity, and so as not to obscure more pertinent aspects of the implementations disclosed herein.

According to some implementations, the AR/VR content stream presentation environment 500 includes an RGB display 502 (e.g., a display with RGB pixels) and an RGB image sensor 504 associated with the HMD 120 and a vantage point of a user 501 (e.g., one of the user's eyes) of the HMD. As will be appreciated by one of ordinary skill in the art, although the AR/VR content stream presentation environment 500 in FIG. 5A depicts one RGB display 502 and one RGB image sensor 504 for the sake of explanation and simplicity, the AR/VR content stream presentation environment 500 may include two sets of the aforementioned components (e.g., one set of components for each eye of the user) in various other implementations.

For example, with reference to the AR/VR content stream presentation environment 500, the HMD 120 may present the AR/VR content stream according to the example embodiment 400 in FIG. 4 where the AR/VR content stream includes one or more eye tracking frames with a plurality of embedded RGB glints interleaved among RGB content frames displayed by the RGB display 502. In this example, the RGB image sensor 504 obtains light intensity data associated with the one or more eye tracking frames with the plurality of embedded RGB glints reflected off the user's eye 501. In some implementations, the RGB image sensor 504 is synchronized with the RGB display 502 in order to reduce the latency and to improve the accuracy when obtaining the light intensity data associated with the one or more eye tracking frames with the plurality of embedded RGB glints.

According to some implementations, the AR/VR content stream presentation environment 510 includes an IR illuminator 514, an RGB display 502 (e.g., a display with RGB pixels), an IR filter 518 (e.g., passive or active), and an IR sensor 512 associated with the HMD 120 and a vantage point of a user 501 (e.g., one of the user's eyes) of the HMD 120. As will be appreciated by one of ordinary skill in the art, although the AR/VR content stream presentation environment 510 in FIG. 5A depicts one IR illuminator 514, one RGB display 502, one IR filter 518, and one IR sensor 512 for the sake of explanation and simplicity, the AR/VR content stream presentation environment 510 may include two sets of the aforementioned components (e.g., one set of components for each eye of the user) in various other implementations.

For example, with reference to the AR/VR content stream presentation environment 510, the HMD 120 may present the AR/VR content stream according to the example embodiment 450 in FIG. 4 where the AR/VR content stream includes a plurality of content frames displayed by the RGB display 502 with a plurality of IR glints embedded thereon based on the IR illuminator 514 and the configuration of the IR filter 518. According to some implementations, the IR filter 518 is arranged to pass IR energy based on the pattern for the plurality of glints and/or the shape of plurality of glints. In this example, the IR sensor 512 obtains light intensity data associated with the plurality of embedded IR glints reflected off the user's eye 501. In some implementations, the IR sensor 512 and the IR filter 518 are synchronized with the RGB display 502 in order to reduce the latency and to improve the accuracy when obtaining the light intensity data associated with the plurality of embedded IR glints.

According to some implementations, the AR/VR content stream presentation environment 520 includes an RGBI display 522 (e.g., a display with RGB and IR pixels) and an IR sensor 512 associated with the HMD 120 and a vantage point of a user 501 (e.g., one of the user's eyes) of the HMD 120. As will be appreciated by one of ordinary skill in the art, although the AR/VR content stream presentation environment 520 in FIG. 5A depicts one RGBI display 522 and one IR sensor 512 for the sake of explanation and simplicity, the AR/VR content stream presentation environment 520 may include two sets of the aforementioned components (e.g., one set of components for each eye of the user) in various other implementations.

For example, with reference to the AR/VR content stream presentation environment 520, the HMD 120 may present the AR/VR content stream according to the example embodiment 450 in FIG. 4 where the AR/VR content stream includes a plurality of content frames displayed by the RGBI display 522 with a plurality of IR glints embedded thereon. In this example, the IR sensor 512 obtains light intensity data associated with the plurality of embedded IR glints reflected off the user's eye 501. In some implementations, the IR sensor 512 is synchronized with the RGBI display 522 in order to reduce the latency and to improve the accuracy when obtaining the light intensity data associated with the plurality of embedded IR glints.

Figure 5B:
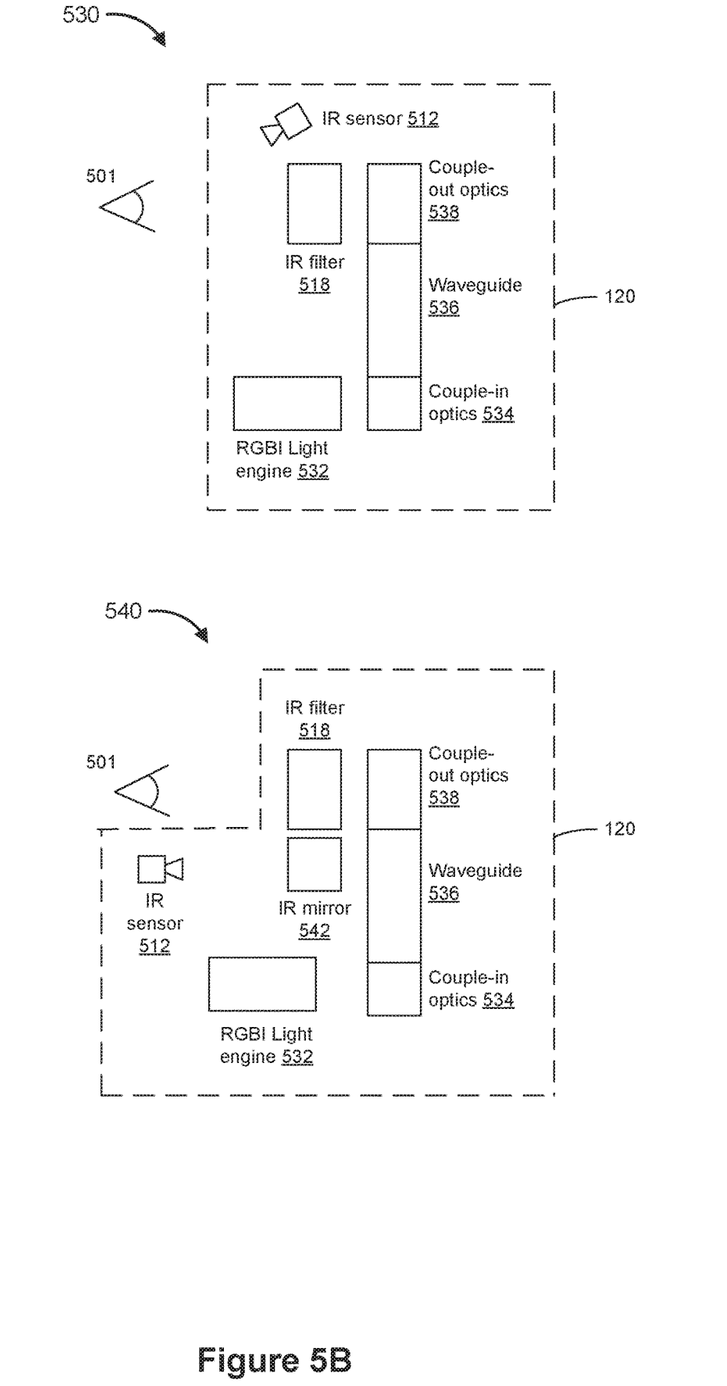

FIG. 5B illustrates example AR/VR content stream presentation environments 530 and 540 in accordance with some implementations. While certain specific features are illustrated, those skilled in the art will appreciate from the present disclosure that various other features have not been illustrated for the sake of brevity, and so as not to obscure more pertinent aspects of the implementations disclosed herein.

According to some implementations, the AR/VR content stream presentation environment 530 includes an RGBI light/optics engine 532 (e.g., with RGB and IR radiation functionality and an optional lens assembly), couple-in optics 534, a waveguide 536, couple-out optics 538, an IR filter 518 (e.g., active or passive), and an IR sensor 512 associated with the HMD 120 and a vantage point of a user 501 (e.g., one of the user's eyes) of the HMD 120. As will be appreciated by one of ordinary skill in the art, although the AR/VR content stream presentation environment 530 in FIG. 5B depicts one RGBI light/optics engine 532, one couple-in optics 534, one waveguide 536, one couple-out optics 538, one IR filter 518, and one IR sensor 512 for the sake of explanation and simplicity, the AR/VR content stream presentation environment 530 may include two sets of the aforementioned components (e.g., one set of components for each eye of the user) in various other implementations.

For example, with reference to the AR/VR content stream presentation environment 530, the HMD 120 may present the AR/VR content stream according to the example embodiment 450 in FIG. 4 where the AR/VR content stream includes a plurality of content frames displayed by the waveguide display, including the RGBI light/optics engine 532, the couple-in optics 534, the waveguide 536, and the couple-out optics 538, with a plurality of IR glints embedded thereon based on the configuration of the IR filter 518. According to some implementations, the IR filter 518 is arranged to pass IR energy based on the pattern for the plurality of glints and/or the shape of plurality of glints. In this example, the IR sensor 512 obtains light intensity data associated with the plurality of embedded IR glints reflected off the user's eye 501. In some implementations, the IR sensor 512 and the IR filter 518 are synchronized with the RGBI light/optics engine 532 in order to reduce the latency and to improve the accuracy when obtaining the light intensity data associated with the plurality of embedded IR glints.

According to some implementations, the AR/VR content stream presentation environment 540 includes an RGBI light/optics engine 532 (e.g., with RGB and IR radiation functionality and an optional lens assembly), couple-in optics 534, a waveguide 536, couple-out optics 538, an IR filter 518 (e.g., active or passive), an IR mirror 542 (e.g., arranged to reflect light reflected off the user's eye 501), and an IR sensor 512 associated with the HMD 120 and a vantage point of a user 501 (e.g., one of the user's eyes) of the HMD 120. As will be appreciated by one of ordinary skill in the art, although the AR/VR content stream presentation environment 540 in FIG. 5B depicts one RGBI light/optics engine 532, one couple-in optics 534, one waveguide 536, one couple-out optics 538, one IR filter 518, one IR mirror 542, and one IR sensor 512 for the sake of explanation and simplicity, the AR/VR content stream presentation environment 540 may include two sets of the aforementioned components (e.g., one set of components for each eye of the user) in various other implementations.

For example, with reference to the AR/VR content stream presentation environment 540, the HMD 120 may present the AR/VR content stream according to the example embodiment 450 in FIG. 4 where the AR/VR content stream includes a plurality of content frames displayed by the waveguide display, including the RGBI light/optics engine 532, the couple-in optics 534, the waveguide 536, and the couple-out optics 538, with a plurality of IR glints embedded thereon based on the configuration of the IR filter 518. According to some implementations, the IR filter 518 is arranged to pass IR energy based on the pattern for the plurality of glints and/or the shape of plurality of glints. In this example, the IR sensor 512 obtains light intensity data associated with the plurality of embedded IR glints reflected off the IR mirror 542. In some implementations, the IR sensor 512 and the IR filter 518 are synchronized with the RGBI light/optics engine 532 in order to reduce the latency and to improve the accuracy when obtaining the light intensity data associated with the plurality of embedded IR glints.

Figure 6:
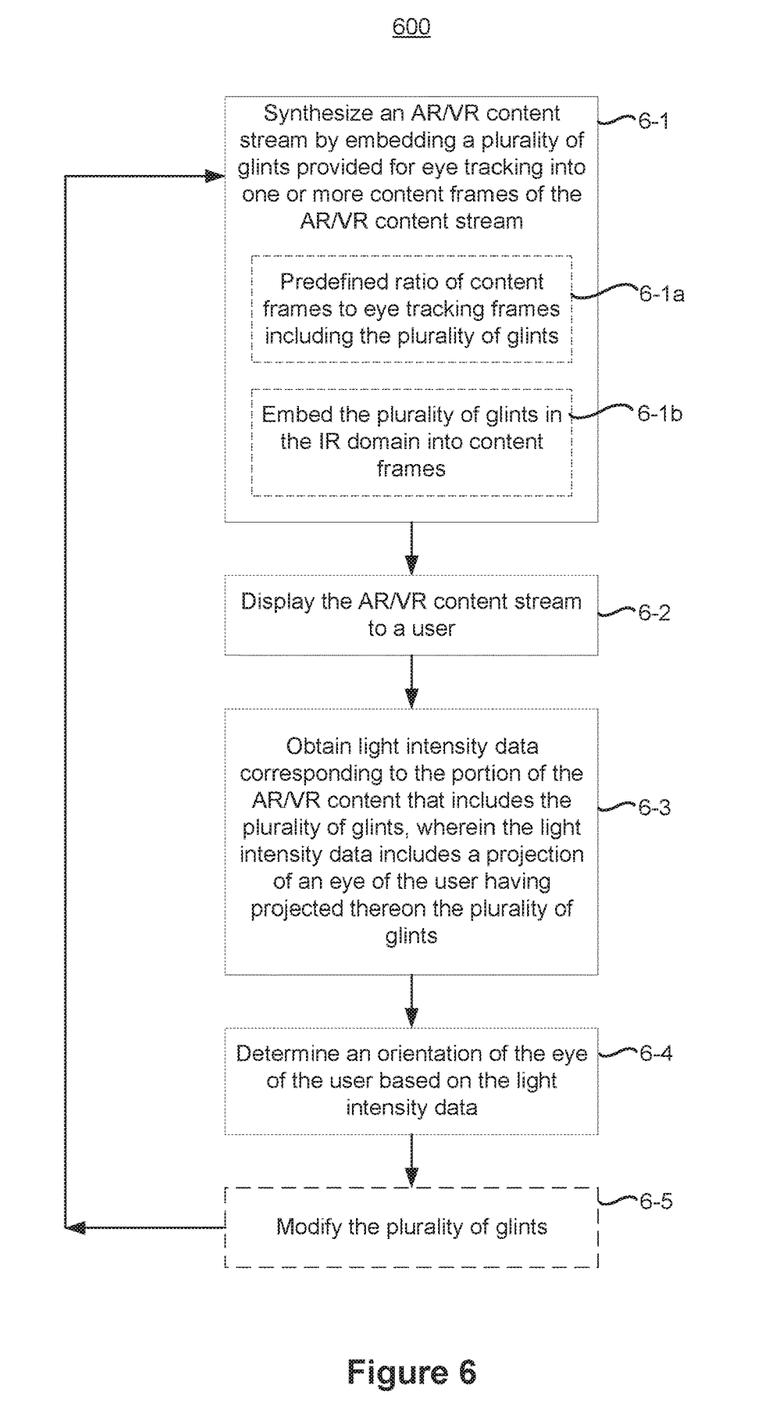
FIG. 6 is a flowchart representation of a method of embedding a plurality of glints provided for eye tracking into one or more content frames of an AR/VR content stream in accordance with some implementations.

FIG. 6 is a flowchart representation of a method 600 of embedding a plurality of glints provided for eye tracking into one or more content frames of an AR/VR content stream in accordance with some implementations. In various implementations, the method 600 is performed by a device with one or more processors, non-transitory memory, one or more AR/VR displays, and an image sensor (e.g., the HMD 120 FIG. 3). In some implementations, the method 600 is performed by processing logic, including hardware, firmware, software, or a combination thereof. In some implementations, the method 600 is performed by a processor executing code stored in a non-transitory computer-readable medium (e.g., a memory). Briefly, in some circumstances, the method 600 includes: synthesizing an AR/VR content stream by embedding a plurality of glints provided for eye tracking into one or more content frames of the AR/VR content stream; displaying the AR/VR content stream to a user of the device; obtaining light intensity data corresponding to the portion of the AR/VR content that includes the plurality of glints, wherein the light intensity data includes a projection of an eye of the user having projected thereon the plurality of glints; and determining an orientation of the eye of the user based on the light intensity data.

As represented by block 6-1, the method 600 includes synthesizing an AR/VR content stream by embedding a plurality of glints provided for eye tracking into one or more content frames of the AR/VR content stream. For example, with reference to FIGS. 1 and 3, the HMD 120 or a component thereof (e.g., the AR/VR presenting unit 344 in FIG. 3) synthesizes or generates the AR/VR content stream by rendering frames for a particular AR/VR experience and determining a pattern for the plurality of glints provided for eye tracking to be embedded into one or more content frames of the AR/VR content stream. In some implementations, the portion of the AR/VR content that includes the glints is out-of-phase when presented to the user (e.g., alternating eyes). In some implementations, the pattern for the plurality of glints is determined based on least one of a next content frame in the AR/VR content stream, ambient light conditions, or the orientation of the eye of the user of the HMD for a previous time period.

According to some implementations, as represented by block 6-1a, the plurality of glints provided for eye tracking are presented according to a predefined ratio of content frames to eye tracking frames including the plurality of glints. In some implementations, the plurality of glints is included in specific eye tracking frames separate from the actual AR/VR content frames (e.g., one out of every X frames includes the plurality of glints). For example, the plurality of glints is displayed in the RGB domain. For example, with reference to FIG. 4, the example embodiment 400 illustrates an eye tracking frame 414 with a plurality of glints 415 embedded thereon interleaved amongst content frames 412 and 416. In some implementations, the method 600 includes determining the ratio of content frames based on at least one of a next content frame in the AR/VR content stream, ambient light conditions, or the orientation of the eye of the user of the HMD for a previous time period.

In some implementations, with reference to the example embodiment 400 in FIG. 4, the plurality of glints 415 is arranged according to a predetermined pattern (e.g., a pseudorandom pattern, a grid pattern, a line/bar pattern, a speckle pattern, a fractal pattern, etc.). In some implementations, the plurality of glints 415 is arranged according to a dynamically determined/changing pattern. In some implementations, with reference to the example embodiment 400 in FIG. 4, each of the plurality of glints 415 are shaped according to a predefined shape (e.g., circles, ovals, polygons, speckle clouds, rectangles, stars, hexagons, etc.). In some implementations, each of the plurality of glints 415 are shaped according to a dynamically determined/changing shape.

According to some implementations, as represented by block 6-1b, the plurality of glints provided for eye tracking are embedded into the content frames in the IR domain In some implementations, the plurality of glints is included on top of the AR/VR content. For example, the plurality of glints is displayed in the IR domain. For example, with reference to FIG. 4, the example embodiment 450 illustrates a content frame 462 with a plurality of glints 475a embedded thereon, a content frame 464 with a plurality of glints 475b embedded thereon, and a content frame 466 with a plurality of glints 475c embedded thereon.

In some implementations, with reference to the example embodiment 450 in FIG. 4, each of the plurality of glints 475a, 475b, and 475c correspond to a same predetermined pattern (e.g., a pseudorandom pattern, a grid pattern, a line/bar pattern, a speckle pattern, a fractal pattern, etc.). According to some implementations, each of the plurality of glints 475a, 475b, and 475c correspond to a dynamically determined/changing pattern. In some implementations, with reference to the example embodiment 450 in FIG. 4, each of the plurality of glints 475a, 475b, and 475c are shaped according to a predefined shape (e.g., circles, ovals, polygons, speckle clouds, rectangles, stars, hexagons, etc.). In some implementations, each of the plurality of glints 475a, 475b, and 475c are shaped according to a dynamically determined/changing shape.

As represented by block 6-2, the method 600 includes displaying the AR/VR content stream to a user of the device (e.g., the user of the HMD 120 in FIGS. 1 and 3). For example, with reference to FIGS. 1 and 3, the HMD 120 or a component thereof (e.g., the AR/VR presenting unit 344 in FIG. 3) displays the AR/VR content stream that includes plurality of glints provided for eye tracking via the one or more AR/VR displays 312. In various implementations, a first AR/VR display among the one or more AR/VR displays 312 displays a first frame of the AR/VR content stream having embedded thereon the plurality of glints, and a second AR/VR display among the one or more AR/VR displays 312 displays a second frame of the AR/VR content stream having embedded thereon the plurality of glints, wherein the first and second frames are associated with temporally adjacent time periods.

As represented by block 6-3, the method 600 includes obtaining light intensity data corresponding to the portion of the AR/VR content that includes the plurality of glints, wherein the light intensity data includes a projection of an eye of the user having projected thereon the plurality of glints. For example, with reference to FIGS. 1 and 3, the HMD 120 or a component thereof (e.g., the eye tracking unit 348) obtains, via the one or more images sensors 314, light intensity data (e.g., images or events) corresponding to the one or more content frames of the AR/VR content stream that include the plurality of glints, wherein the light intensity data includes a projection of an eye of the user of the HMD 120 having projected thereon the plurality of glints. In some implementations, the image sensor is synchronized with the one or more AR/VR displays in order to obtain, via the one or more image sensors 314, light intensity data corresponding to the one or more content frames of the AR/VR content stream that include the plurality of glints. In some implementations, the image sensor is synchronized with the one or more AR/VR displays. In some implementations, the exposure window for the image sensor is set based on the image buffer of the one or more AR/VR displays.

As represented by block 6-4, the method 600 includes determining an orientation of the eye of the user based on the light intensity data. For example, with reference to FIGS. 1 and 3, the HMD 120 or a component thereof (e.g., the eye tracking unit 348) determines an orientation (or gaze direction) of the eye of the user of the HMD 120 based on the light intensity data. As one example, the HMD tracks the user's eyes as an input for interactive AR/VR element. As another example, eye tracking is also used for contextual awareness as to the user's gaze direction or point of fixation. As yet another example, eye tracking is used to perform foveated rendering in order to reduce the resolution of out of focus content to decrease power consumption.

As represented by block 6-5, the method 600 optionally includes modifying the plurality of glints for a next frame or time period. For example, with reference to FIGS. 4A-4B, the HMD 120 or a component thereof (e.g., the AR/VR presenting unit 344) modifies the pattern associated with the plurality of glints or the shape of the plurality of glints for a next time period based on current ambient light conditions, current eye tracking (or gaze direction), the location of interactive AR/VR content in the next content frame, or the like.

According to some implementations, the pattern in which the plurality of glints 415 is arranged based on ambient light conditions, eye tracking (e.g., predictive glint positions/patterns), locations of interactive AR/VR content (e.g., increase density of glints relative to locations of interactive content for improved eye tracking), or the like. In some implementations, with reference to the example embodiment 400 in FIG. 4, the shape of each of the plurality of glints 415 are determined based on ambient light conditions (e.g., stars, hexagons, etc. instead of dots to discriminate from ambient light), eye tracking (e.g., predictive glint positions/patterns), locations of interactive AR/VR content (e.g., increase density of glints relative to locations of interactive content for improved eye tracking), or the like.

According to some implementations, with reference to the example embodiment 450 in FIG. 4, the pattern in which the plurality of glints 475a, 475b, and 475c is arranged based on ambient light conditions, eye tracking (e.g., predictive glint positions/patterns), locations of interactive AR/VR content (e.g., increase density of glints relative to locations of interactive content for improved eye tracking), or the like (e.g., at the time the respective AR/VR content frame is rendered). According to some implementations, with reference to the example embodiment 450 in FIG. 4, the shape of each of the plurality of glints 475a, 475b, and 475c are determined based on ambient light conditions (e.g., stars, hexagons, etc. instead of dots to discriminate from ambient light), eye tracking (e.g., predictive glint positions/patterns), the rendered location of interactive AR/VR content (e.g., increase density of glints relative to locations of interactive content for improved eye tracking), or the like (e.g., at the time the respective AR/VR content frame is rendered).

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at device including one or more processors, non-transitory memory, one or more displays, and an image sensor:
   synthesizing a content stream including a plurality of content frames to be displayed over an area by embedding, into the content stream, a plurality of glints to be projected from within the area;
   displaying, via the one or more displays, the content stream over the area to a user;
   obtaining, via the image sensor, light intensity data corresponding to an eye of the user having projected thereon the plurality of glints; and
   determining an orientation of the eye of the user based on the light intensity data.

2. The method of claim 1, wherein the content stream includes an eye tracking frame with the plurality of glints embedded thereon that is displayed at a different time than the plurality of content frames.

3. The method of claim 1, wherein at least one of the plurality of content frames includes the plurality of glints embedded thereon.

4. The method of claim 3, wherein the plurality of glints is displayed in the infrared (IR) domain.

5. The method of claim 1, further comprising determining a pattern for the plurality of glints based on at least one of a next content frame in the content stream, ambient light conditions, or the orientation of the eye of the user for a previous time period.

6. The method of claim 1, further comprising determining a shape for each of the plurality of glints based on at least one of a next content frame in the content stream, ambient light conditions, or the orientation of the eye of the user for a previous time period.

7. The method of claim 1, further comprising determining a display time for the plurality of glints based on at least one of a next content frame in the content stream, ambient light conditions, or the orientation of the eye of the user for a previous time period.

8. A device comprising:
   one or more processors;
   a non-transitory memory;
   an image sensor;
   one or more displays; and
   one or more programs stored in the non-transitory memory, which, when executed by the one or more processors, cause the device to:
   synthesize a content stream including a plurality of content frames to be displayed over an area by embedding, into the content stream, a plurality of glints to be projected from within the area;
   display, via the one or more displays, the content stream over the area to a user;
   obtain, via the image sensor, light intensity data corresponding to an eye of the user having projected thereon the plurality of glints; and
   determine an orientation of the eye of the user based on the light intensity data.

9. The device of claim 8, wherein the content stream includes an eye tracking frame with the plurality of glints embedded thereon that is displayed at a different time than the plurality of content frames.

10. The device of claim 8, wherein at least one of the plurality of content frames includes the plurality of glints embedded thereon.

11. The device of claim 10, wherein the plurality of glints is displayed in the infrared (IR) domain.

12. The device of claim 11, wherein the one or more displays include an RGB display, an IR illuminator, and an IR filter.

13. The device of claim 11, wherein the one or more displays include an RGBI display.

14. The device of claim 8, wherein the one or more programs further cause the device to determine a pattern for the plurality of glints based on at least one of a next content frame in the content stream, ambient light conditions, or the orientation of the eye of the user for a previous time period.

15. The device of claim 8, wherein the one or more programs further cause the device to determine a shape for each of the plurality of glints based on at least one of a next content frame in the content stream, ambient light conditions, or the orientation of the eye of the user for a previous time period.

16. The device of claim 8, wherein the one or more programs further cause the device to determine a display time for the plurality of glints based on at least one of a next content frame in the content stream, ambient light conditions, or the orientation of the eye of the user for a previous time period.

17. A non-transitory memory storing one or more programs, which, when executed by one or more processors of a device with one or more displays and an image sensor, cause the device to:
- synthesize a content stream including a plurality of content frames to be displayed over an area by embedding, into the content stream, a plurality of glints to be projected from within the area;
- display, via the one or more displays, the content stream over the area to a user;
- obtain, via the image sensor, light intensity data corresponding to an eye of the user having projected thereon the plurality of glints; and
- determine an orientation of the eye of the user based on the light intensity data.

18. The non-transitory memory of claim 17, wherein the content stream includes an eye tracking frame with the plurality of glints embedded thereon that is displayed at a different time than the plurality of content frames.

19. The non-transitory memory of claim 17, wherein at least one of the plurality of content frames includes the plurality of glints embedded thereon.

20. The non-transitory memory of claim 17, wherein the one or more programs further cause the device to determine a pattern, shape, or display time for the plurality of glints based on at least one of a next content frame in the content stream, ambient light conditions, or the orientation of the eye of the user for a previous time period.

* * * * *